(12) United States Patent
Mukae

(10) Patent No.: US 6,758,929 B2
(45) Date of Patent: Jul. 6, 2004

(54) METHOD OF MANUFACTURING PNEUMATIC TIRE

(75) Inventor: Makito Mukae, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 230 days.

(21) Appl. No.: 10/076,446

(22) Filed: Feb. 19, 2002

(65) Prior Publication Data

US 2002/0112807 A1 Aug. 22, 2002

(30) Foreign Application Priority Data

Feb. 20, 2001 (JP) .................................... 2001-042786
Feb. 8, 2002 (JP) .................................... 2002-032634

(51) Int. Cl.⁷ .............................................. B29D 30/32
(52) U.S. Cl. .................... 156/111; 156/130.7; 156/131; 156/132; 156/135
(58) Field of Search ............................... 156/111, 131, 156/132, 133, 130.7, 135, 136; 152/552, 539, 541

(56) References Cited

U.S. PATENT DOCUMENTS

| | | | | |
|---|---|---|---|---|
| 3,654,007 A | * | 4/1972 | Winstanley et al. | 156/132 |
| 4,683,021 A | * | 7/1987 | Stalter et al. | 156/415 |
| 5,294,275 A | * | 3/1994 | Kawaguchi et al. | 156/136 |
| 6,530,411 B1 | * | 3/2003 | Tsukagoshi et al. | 152/552 |

FOREIGN PATENT DOCUMENTS

WO    WO 99/48708    9/1999

OTHER PUBLICATIONS

Patent Abstracts of Japan., vol. 011, No. 172, 62–3935, Jan. 9, 1987.

* cited by examiner

Primary Examiner—Geoffrey L. Knable
(74) Attorney, Agent, or Firm—Sughrue Mion, PLLC (57) ABSTRACT

In the shaping of a green tire for a pneumatic tire, a pair of bead cores each attached with a stiffener are set to insides of both resulting hook-shaped wrap portions of a carcass band at a fall-down posture of the stiffener, and thereafter the stiffener of the fall-down posture is stood up on an outer peripheral side of the wrap portion, and a belt and a tread are piled on an outer peripheral side of the carcass band.

14 Claims, 8 Drawing Sheets

METHOD OF MANUFACTURING PNEUMATIC TIRE

BACKGROUND OF THE INVENTION

1. Field of the Invention

This invention relates to a method of manufacturing a pneumatic tire which can efficiently manufacture a tire having an improved bead portion structure.

2. Description of Related Art

In the conventional pneumatic tires such as heavy duty tire or the like, at least one carcass ply is toroidally extended from a tread portion through a sidewall portion to a bead portion, and wound around a ring-shaped bead core embedded in the bead portion from an inside of the tire toward an outside thereof in a radial direction so as to make a turnup height sufficiently high for preventing pull-out of a ply cord during the running of the tire under loading, and a turnup portion is embedded and fixed in a rubber portion.

Figure 8A:
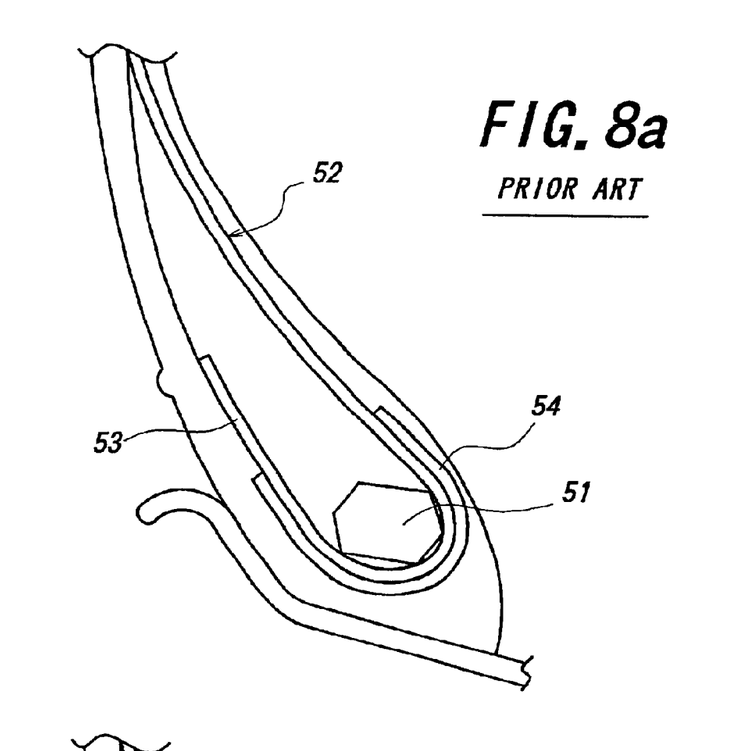
FIGS. 8a and 8b are schematically section views illustrating a conventional bead portion structure.

In FIG. 8a is schematically shown a cross-sectional view of a bead portion in the above conventional tire, wherein a carcass ply 52 is wound around a bead core 51 from an inside of the tire toward an outside thereof in a widthwise direction and a radially outer end of a turnup portion 53 of the carcass ply is positioned outward from an outer end of a wire chafer 54, which is turned around the bead core along an outer surface of the carcass ply, in a radial direction of the tire.

Figure 8B:
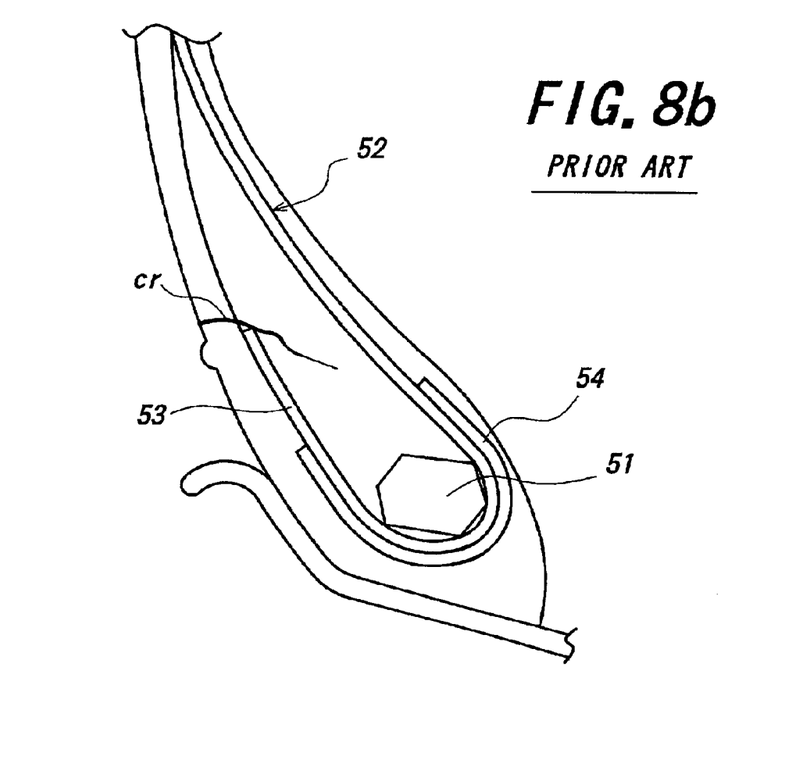

In such a conventional bead portion structure, however, a difference in rigidity is created between an inside and an outside bordering the outer end position of the turnup portion 53 of the carcass ply 52 in the radial direction of the tire, so that stress is concentrated in the outer end of the turnup portion 53 and a neighborhood thereof by repetitive distortion deformation ranging from a bead portion to a sidewall portion and circumferentially shearing deformation during the running of the tire under loading. As a result, it is apt to easily create separation of such an outer end from rubber, which results in the occurrence of bead portion crack cr as shown in FIG. 8b.

Figure 9:
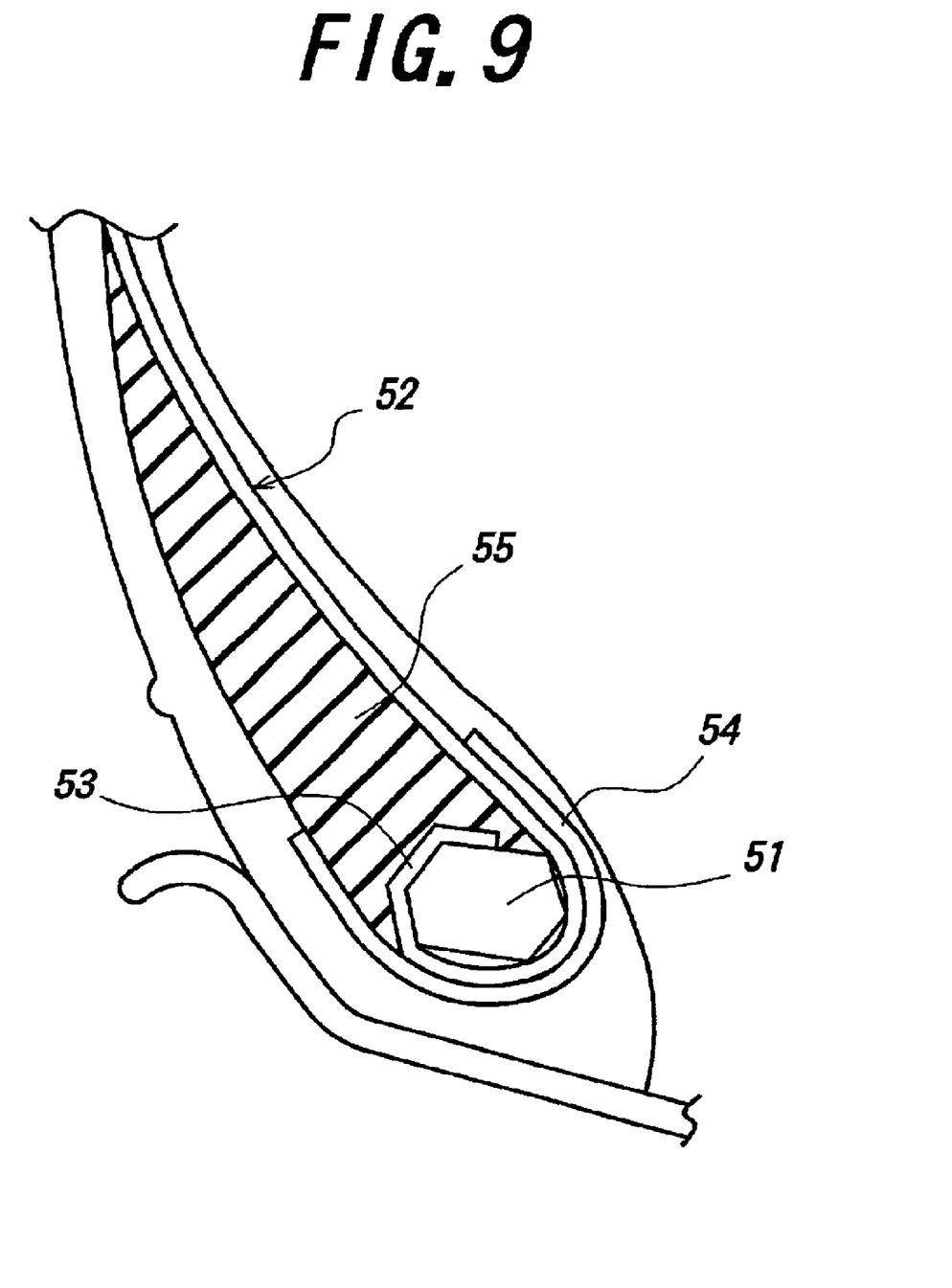
FIG. 9 is a schematically section view illustrating an improved bead portion structure.

In order to solve such a problem in the conventional bead portion structure, it is useful that the turnup portion 53 of the carcass ply 52 is wound along a peripheral face of a ring-shaped bead core 51 instead of highly winding up around the bead core 51 outward in the radial direction to substantially or completely eliminate projection of the turnup portion 53 outward from the bead core 51 in the radial direction as shown in FIG. 9. In this case, it has been confirmed that the reduction of a tire weight can be realized in addition to a high improvement of a durability of the bead portion.

In the bead portion structure as shown in FIG. 9, however, the turnup portion 53 is wound along the outer peripheral face of the bead core 51, so that a stiffener 55 to be disposed at an outer peripheral side of the bead core 51 can not be previously attached to the bead core 51 in a shaping operation of the tire and hence a subsequent step of attaching only the stiffener 55 is separately required. For this end, the shaping time becomes longer and the shaping efficiency lowers to not less than 20% as compared with such a conventional structure that the stiffener 55 may be previously attached to the bead core 51 as shown in FIG. 8.

SUMMARY OF THE INVENTION

It is, therefore, an object of the invention to solve the above problem of the conventional technique and to provide a method of manufacturing a pneumatic tire wherein it is possible to prevent the lowering of the tire shaping efficiency by previously attaching the stiffener to the bead core prior to the tire shaping even in the bead portion structure shown in FIG. 9 and also it is possible to handle the stiffener and the bead core as a single part even in steps of arrangement, setup and so on prior to the tire shaping operation.

Even in the bead portion structure as shown in FIG. 9, there are considered some points that a region of the bead core 51 not covered with the turnup portion 53 is existent in a full peripheral face at a cross section of the bead core 51, and it is possible to sandwich a part of the stiffener 55 between the bead core 51 and the turnup portion 53 wound therearound, and the stiffener previously attached to the bead core can be handled as a one-piece body unless the stiffener is not separated from the bead core even if the stiffener is provided with a notch or the stiffener is partly ripped off from the bead core, and it is possible to arrange the stiffener on a given position by turning the stiffener from a fall-down posture based on the notch, partial ripping or the like to a stand-up posture under the winding of an end portion of the carcass ply around the bead core, and so on. The invention is made by noticing these points.

According to the invention, there is the provision of a method of manufacturing a pneumatic tire, characterized in that when an end portion of a carcass ply is wound around a ring-shaped bead core and a stiffener is arranged on an outer peripheral side of a turnup portion of the carcass ply to shape a green tire, a carcass material is previously folded at both axially end portions in a direction opposite to each other and shaped into a cylinder to form a carcass band, and a pair of bead cores each attached with a stiffener are set to insides of both resulting hook-shaped wrap portions of the carcass band at a fall-down posture of the stiffener, and thereafter the stiffener of the fall-down posture is stood up on an outer peripheral side of the wrap portion, and a belt and a tread are piled on an outer peripheral side of the carcass band.

According to the invention, the bead core previously attached with the stiffener is set at a given position of the carcass band, whereby the stiffener can be placed without a separate and independent step of arranging the stiffener alone. And also, the stiffener can be arranged on and attached to the outer peripheral side of the wrap portion of the carcass band with given shape and dimensional accuracy by standing up the stiffener previously rendered into a fall-down posture after the setting of the bead core. Therefore, the separate step of attaching only the stiffener alone is useless and hence the shaping efficiency of the tire can be advantageously improved.

Further, the bead core previously attached and integrally united with the stiffener is handled as a single part, so that their handling can be more facilitated in the steps of arrangement, setup and so on prior to the tire shaping operation.

In this case, the setting of the bead core to the inside of the wrap portion of the carcass band can be naturally conducted by a hand work of a worker. However, in order to automate such a setting work, it is favorable that each of the bead cores attached with the stiffener is previously supported a bead setter and moved to a given position in an axial direction between the wrap portions and thereafter the wrap portion is subjected to an elastically enlarging deformation by moving the bead setter, for example, in the axial direction and subsequently the bead setter is retracted outward in a radial direction at that position to set the bead core attached with the stiffener of the fall-down posture into an inside of an elastically returned wrap portion.

In this case, the bead setter itself adsorbing and supporting the bead core through a magnetic action or under a negative pressure can set the bead core to a given position under a state of elastically enlarging and deforming the wrap portion of the carcass band and hence a special means for conducting only the enlarging deformation is useless, so that the structure of the tire shaping apparatus becomes simple and a cycle time for actuating the above special means is useless and it can be attempted to more improve the shaping efficiency.

In the method according to the invention, when the stiffener previously attached to the bead core is fallen down at a position corresponding to a notch formed in the stiffener, there is a merit that the stiffener can be surely and smoothly fallen down at a given position without causing an extra deformation in the stiffener. On the other hand, after the stiffener is stood up, the wrap portion of the carcass band is sufficiently attached to such a portion of the stiffener that is located at an inner side from the notch and closed to the peripheral face of the bead core and also a top part of the wrap portion of the carcass band is completely enveloped by the stiffener, so that the joining of the wrap portion to the stiffener can be more ensured. Furthermore, an area of the stiffener attached to the bead core can be more largely ensured as compared with a case that the stiffener previously attached to the bead core is partly ripped off from the bead core without forming the notch in the stiffener and hence the unexpected separation of the stiffener from the bead core can effectively be prevented.

The fall-down deformation of the stiffener may be conducted after the bead core is supported by the bead setter or before the bead core is transferred to the bead setter if the required fall-down posture of the stiffener itself can be maintained for a relatively long time.

In the former case, the stiffener is rendered into the fall-down posture after the bead core is locked at a given position and before the bead setter is retracted, so that the fall-down time can be shortened. And also, there is an advantage that the falling means can be added to the bead setter from a viewpoint of an installation space.

When the fall-down deformation of the stiffener is conducted at a state that a support tongue-shaped portion of the stiffener protruding from a rotating fulcrum of the stiffener toward a forward side in a falling direction is attached to the surface of the bead core, an accidental peeling of the stiffener from the bead core in the fall-down deformation of the stiffener or under the fall-down posture of the stiffener can be more effectively prevented regardless of the formation of notch for the fall-down deformation.

The stand-up deformation of the fallen stiffener may be conducted after the bead setter is retracted under the locking of the bead core and prior to the shaping of the carcass band or together with the outward expansion deformation of a central portion of the carcass band in the axial direction during the shaping of the carcass band after the bead core is locked.

Moreover, the shaping of the carcass band used herein means that the carcass band itself is expansion deformed at its central portion and does not include a shaping of a green case after given tire constructional members such as sidewall rubber, rubber chafer and the like are attached onto an outer peripheral side of the carcass band.

In the former case, the addition of the standing means is required, but the stiffener can surely be stood up as is expected irrespectively of sectional shape, size and the like of the stiffener. In the latter case, the stiffener can be automatically stood up without a special standing means, but there is caused a fear that if the shape, size, fall-down posture and the like of the stiffener are unique, an unwilled portion of the stiffener is attached to the peripheral face of the carcass band in the course of the shaping.

According to the invention, when the bead core attached with the stiffener is set to an inside of the wrap portion, the bead setter supported with the bead core is moved outward in an axial direction to elastically enlarge the wrap portion of the carcass band, and after the bead core is locked through a bead lock, the bead setter is retracted outward in a radial direction to separate the bead core from the bead setter to thereby conduct the setting of the bead core. In this case, the bead setter may be moved inward in the radial direction prior to the enlarging deformation of the wrap portion in, for example, an axial direction through the bead setter.

Alternatively, the elastically enlarging deformation of the wrap portion through the bead setter supported with the bead core is conducted at a state that the size of the carcass band is enlarged in the radial direction, and thereafter the bead setter is separated from the bead core and then retracted.

In any case, the bead core can be rapidly and surely set to the inside of the wrap portion at a given position.

In the above method according to the invention, an operation ranging from a step of setting the bead core to a step of joining the belt and the tread to the carcass band can be conducted on one shaping drum. And also, after the bead core is set, the carcass band may be transferred to another shaping drum and joined with the belt and the tread. Further, before the setting of the bead core is completed or the bead setter is retracted, the carcass band may be transferred to another shaping drum and joined with the belt and the tread.

BRIEF DESCRIPTION OF THE DRAWINGS

The invention will be described with reference to the accompanying drawings, wherein.

DETAILED DESCRIPTION OF THE INVENTION

Figure 1A:
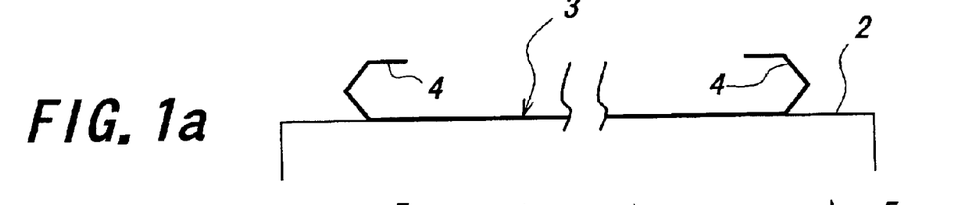
FIGS. 1a to 1e are schematic flow diagrams illustrating an embodiment of the invention, respectively.
Figure 1B:
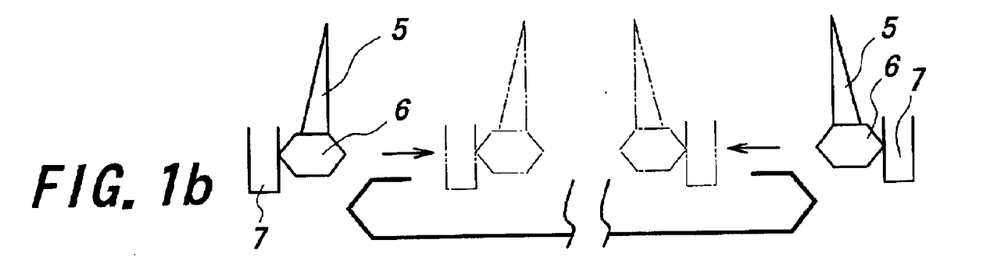
Figures 1C, 1D:
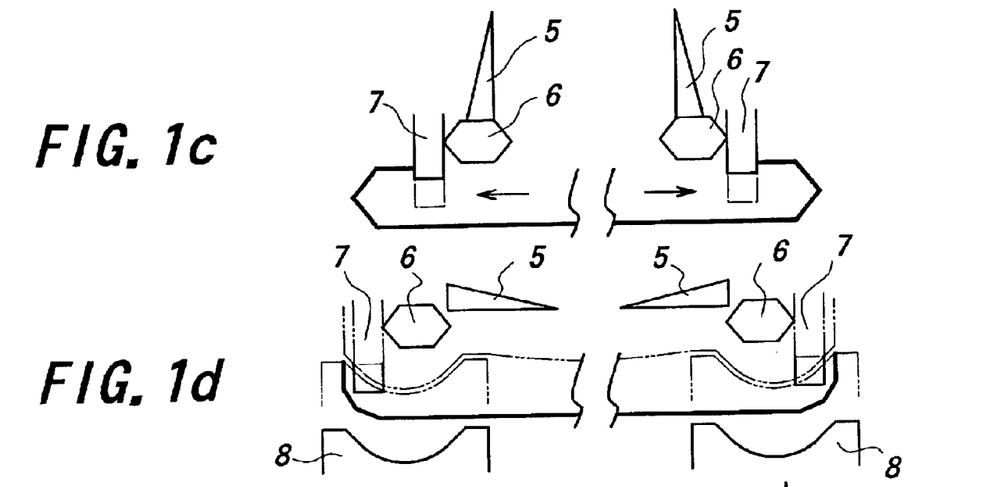
Figure 1E:
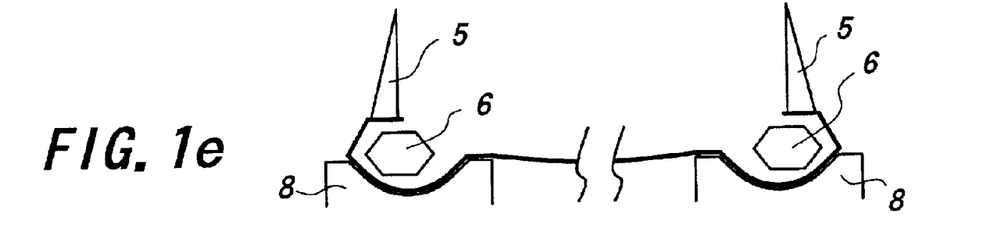
Figure 2:
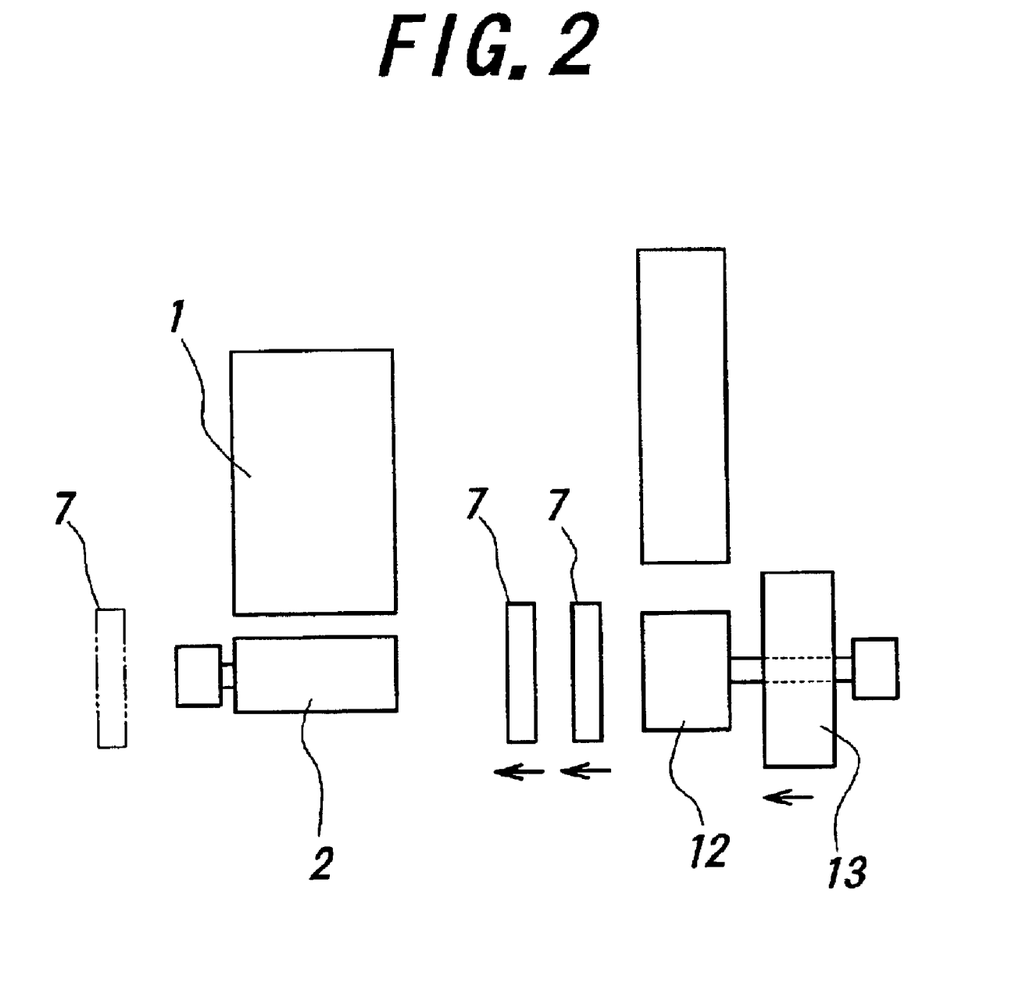
FIG. 2 is a schematically plan view of an apparatus for conducting steps shown in FIG. 1.

In FIGS. 1a to 1e are shown flow diagrams carrying out a first embodiment of the invention on one shaping drum, respectively, and FIG. 2 is a schematically plan view of an apparatus for carrying out these flow diagrams.

At first, a carcass material is fed from a server 1 to a shaping drum 2 and shaped into a cylinder as shown by axially section in FIG. 1a to form a carcass band 3. The carcass band 3 is provided with hook-shaped wrap portions folded in a direction opposite to each other based on a previous forming of both axially end portions of the carcass material.

Then, a pair of bead cores 6 each attached with a stiffener 5 are supported by respective bead setters 7 shown in FIG. 2 through, for example, magnetic adsorption so as to concentrically locate with each other and then moved inward from both end sides of the carcass band 3 up to positions as shown by phantom lines in FIG. 1b between both wrap portions 4 of the carcass band 3 in an axial direction thereof.

When an inner diameter defined by inner tops of several radially extensible hold segments constituting the bead setter 7 is set to be smaller than an outer diameter of the wrap portion 4 of the carcass band 3, the wrap portion 4 is elastically deformed in a crushing direction by the inner tops of the hold members in the axially inward movement of the bead core as mentioned above.

Then, the bead setters 7 are horizontally moved in a direction separating away from each other as shown in FIG. 1c, whereby each of the wrap portions 4 is elastically deformed in an enlarging direction by the inner tops of the hold members as shown in FIG. 1d.

In this case, when the inner diameter defined by the top ends of the hold members is previously selected to the outer diameter of the wrap portion 4 as mentioned above, if an engaging quantity of the top end of the hold member in the bead setter with the wrap portion 4 is too small or the engaging between the top end and the wrap portion is not conducted, the top ends of the hold members in the bead setter 7 are moved inward in the radial direction to ensure a sufficient engaging quantity to the warp portion as shown by a phantom line in FIG. 1c.

Thereafter, a bead lock 8 constituting a part of the shaping drum 2 is actuated as shown by a phantom line in FIG. 1d to lock the bead core 6, and subsequently each of the bead setters 7 is retracted outward in the radial direction so as to separate away from the wrap portion 4, whereby the bead core 6 is left and set in an inside of an elastically returned wrap portion 4 as shown in FIG. 1e.

In the setting of the bead core as mentioned above, the fall-down and stand-up operations of the stiffener 5 can be carried out, for example, as shown in FIGS. 3a to 3d. This shows a case that a notch 9 for the fall-down operation is previously formed in the stiffener 5 attached to the bead core.

Figure 3A:
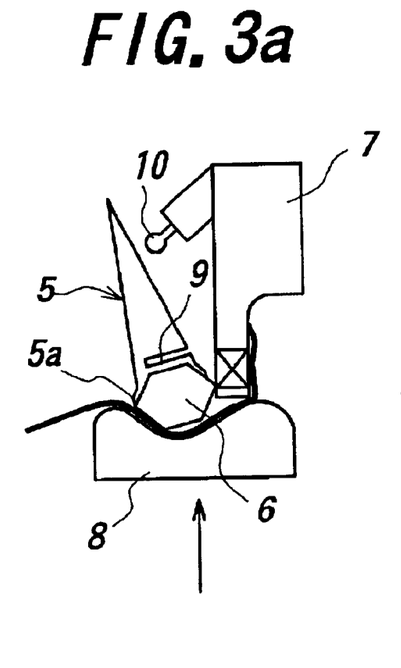
FIGS. 3a to 3d are schematic views illustrating steps of falling down and standing up a stiffener, respectively.
Figure 3B:
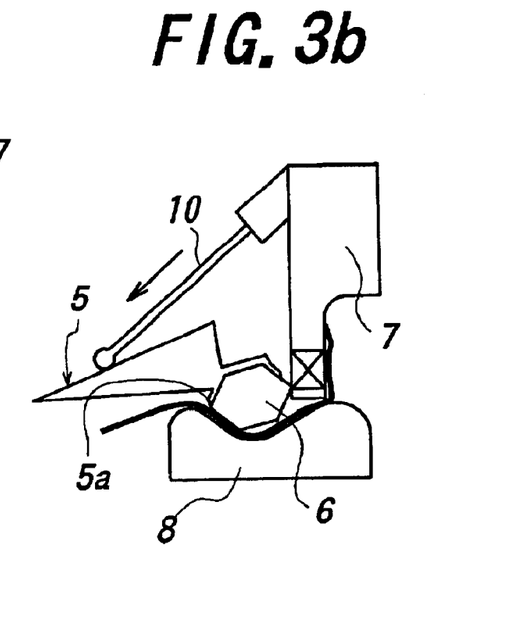
Figure 3C:
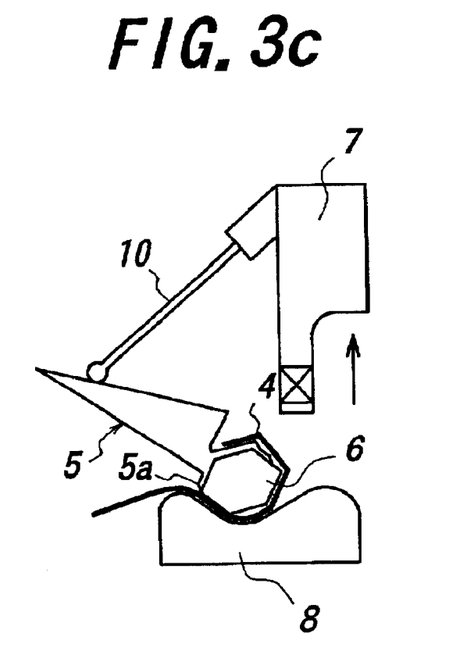
Figure 3D:
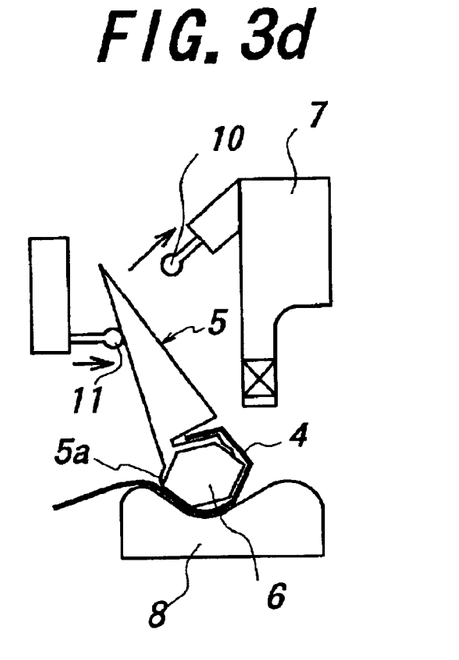

At a state of locking the bead core 6 through the bead lock 8 as shown in FIG. 3a, a pusher 10 arranged on the bead setter 7 is protruded to sufficiently fall-down the stiffener 5 from a position corresponding to the notch 9 as shown in FIG. 3b. Then, the bead setter 7 is retracted outward in the radial direction to surely enter the wrap portion 4 into the notch 9 as shown in FIG. 3c. Thereafter, as shown in FIG. 3d, the stiffener is stood up from the fall-down posture through another pusher 11 while retracting the pusher 10 to an original position to involve a top part of the wrap portion 4 into the notch 9.

In the falling and standing deformations of the stiffener 5 as mentioned above, a support tongue-shaped portion 5a protruding from a rotating fulcrum of the stiffener 5 toward a forward side in a falling direction is provided on the stiffener 5 and attached to a peripheral face of the bead core 6 as shown in FIG. 3, whereby an unexpected separation of the stiffener 5 from the bead core 6 can be effectively prevented in the falling deformation or at a fall-down posture. This is particularly effective when a part of the stiffener is separated from the bead core 6 and fallen down without forming a notch for the falling deformation.

Figure 4:
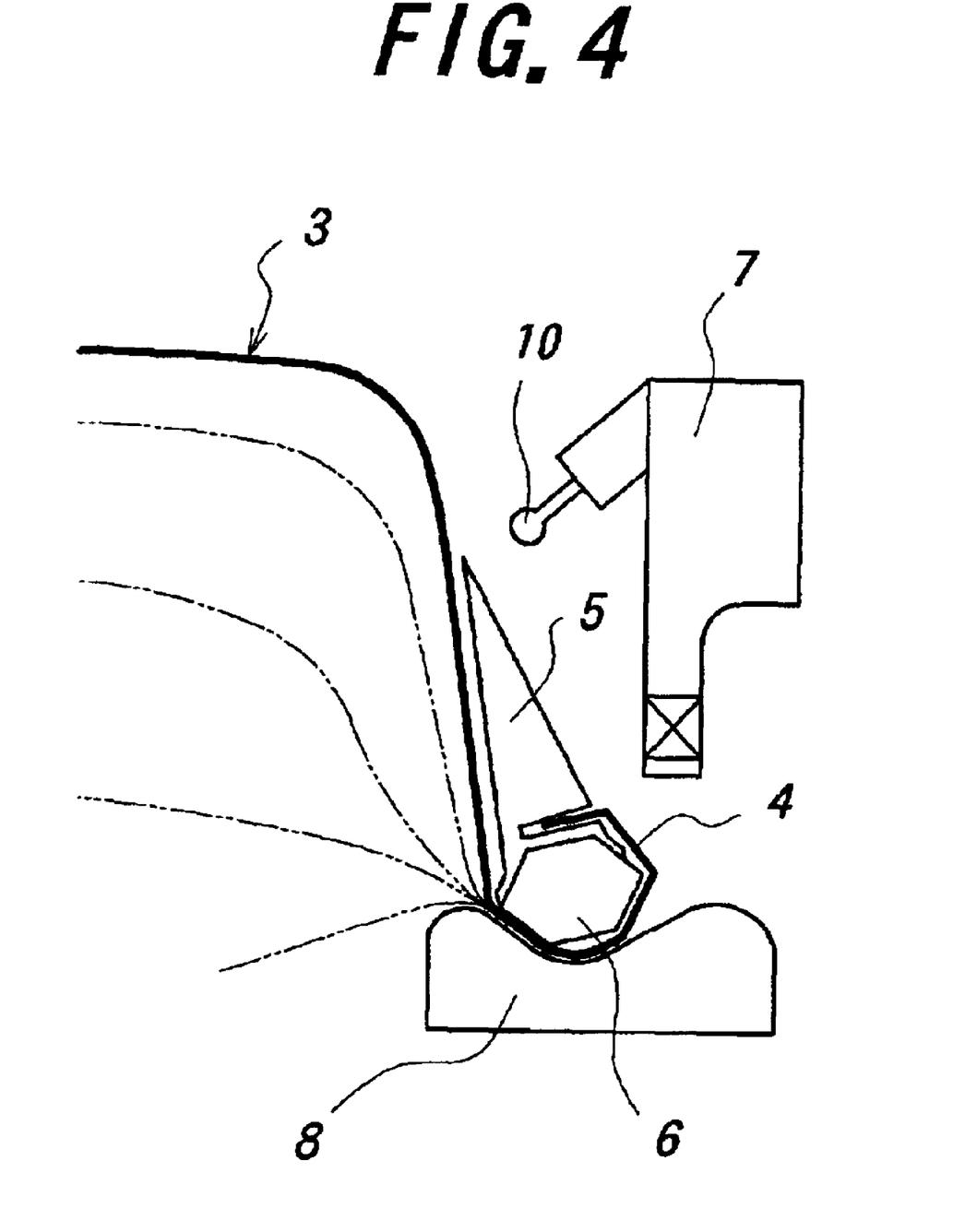
FIG. 4 is a schematic view illustrating a complete stand-up state of a stiffener.

Moreover, the stand-up operation of the stiffener 5 is more surely attained by expansion-deforming an axially central portion of the carcass band 3 outward in the radial direction at a subsequent shaping step of the carcass band 3 to apply an external force in a standing-up direction from the carcass band itself to the stiffener 5 as shown in FIG. 4.

After the setting of the bead core 6 to a given position and the fall-down and stand-up operations of the stiffener 5 as mentioned above, other required tire constitutional members are applied onto the carcass band 3 and then the shaping of the carcass band 3 is carried out by approaching both the bead cores 6 to each other, while an outer peripheral face of the thus shaped carcass band 3 is adhered and closely joined to an inner peripheral face of a belt-tread band (not shown) previously shaped on a belt-tread shaping drum 12 shown in FIG. 2 and transferred through a holding ring 13 to a given position at an outer peripheral side of the shaping drum 2 to conduct a shaping of a green tire.

In the method according to the invention, therefore, it is possible to arrange the stiffener 5 previously attached to the bead core 6 onto a given position, so that a separate and independent step of attaching the stiffener 5 is useless and a fear of degrading the shaping efficiency of the tire can be advantageously removed.

Figure 5A:
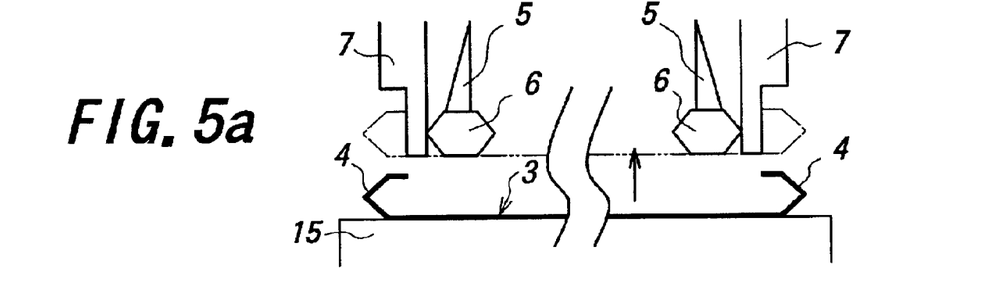
FIGS. 5a to 5c are schematic flow diagrams illustrating another embodiment of the invention, respectively.
Figure 5B:
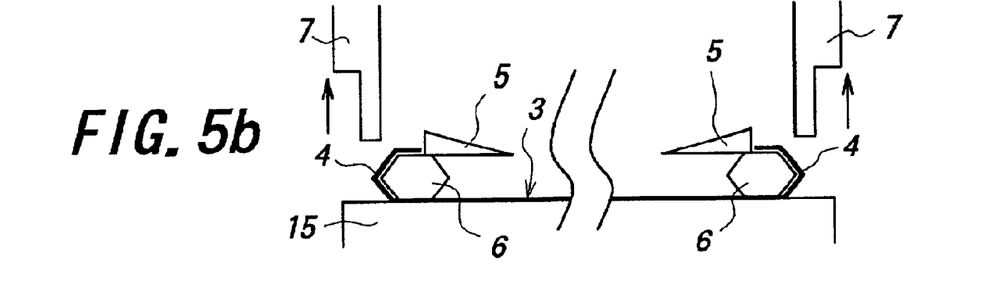
Figure 5C:
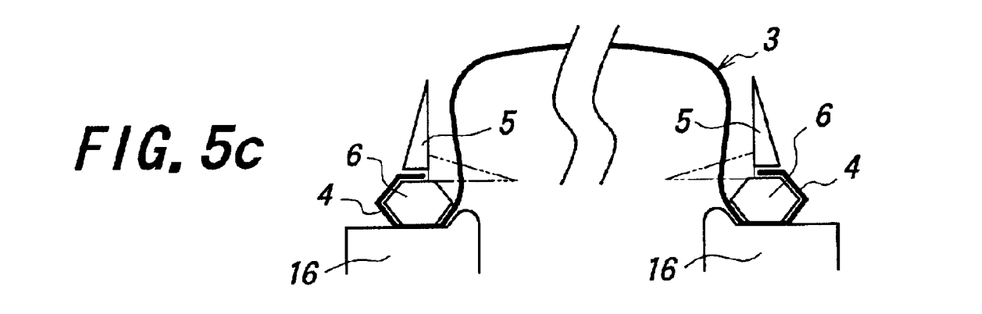

FIGS. 5a to 5c show a second embodiment of the invention. As shown in FIG. 5a, a pair of bead cores 6 each attached with a stiffener 5 and adsorbed and supported by a respective bead setter 7 are moved to given positions between both previously formed wrap portions 4 of a carcass band 3 placed on a carcass band drum 15 and then the carcass band drum 15 and hence the carcass band 3 are enlarged outward in a radial direction to a position shown by a phantom line in FIG. 5a. Thereafter, the wrap portion 4 is elastically enlarged outward in an axial direction by the bead setter 7 likewise the above case and then the stiffener 5 is fallen down in the same manner as described in FIG. 3 with the locking of the bead core 6 through a bead lock (not shown) or without locking the bead core 6. Next, the bead setters 7 are retracted outward in the radial direction as shown in FIG. 5b to elastically return the wrap portions 4 and set each of the bead cores 6 to a given position at the inside of the wrap portion 4.

Thereafter, the carcass band 3 provided with the bead cores 6 is transferred from the carcass band drum 15 to a pair of former rings 16 after the stiffener 5 previously rendered into a fall-down posture is stood up in the same manner as described in FIG. 3 or while maintaining the fall-down posture of the stiffener 5, at where the carcass band 3 is shaped.

If the stiffener 5 is still maintained at the fall-down posture on the former ring 16, the stiffener 5 is preferably stood up by using a standing means arranged on the former ring 16, and subsequently the stand-up posture of the stiffener is more surely attained accompanied with the deformation of the carcass band during the shaping.

Moreover, other steps in the shaping of a green tire are substantially the same as described on the first embodiment.

Figure 6:
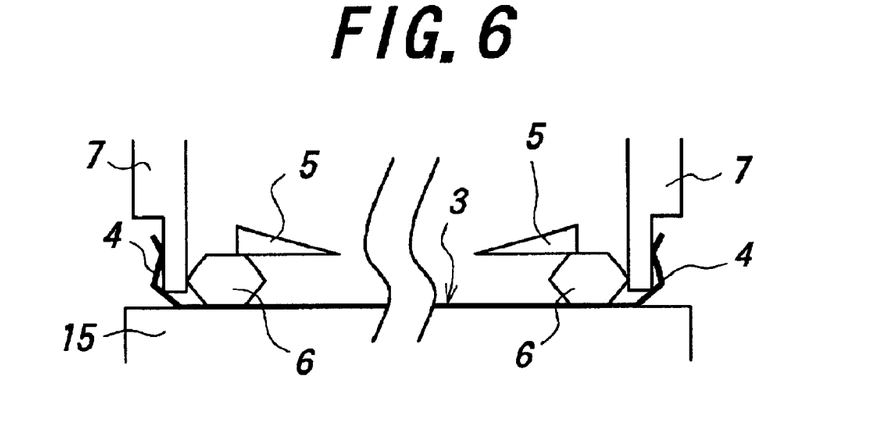
FIG. 6 is a schematic view illustrating a modified embodiment of a transfer timing of a carcass band.

When the carcass band 3 is transferred from the carcass band drum 15 to the former rings 16, as shown in FIG. 6 instead of FIG. 5b, the setting of the bead core 6 can be completed by transferring onto the former rings 16 at a state of elastically deforming the wrap portion 4 in the enlarging direction by the bead setter 7 and before the bead setter is retracted outward in the radial direction.

Even in the second embodiment, it is possible to previously attach the stiffener 5 to the bead core 6, so that a separate step of attaching the stiffener 5 is useless and the lowering of the tire shaping efficiency can be sufficiently prevented.

In any case, the top part of the wrap portion 4 of the carcass band 3 is involved in the stiffener 5 closely attached to the bead core 6 through the notch 9 and sufficiently joined thereto, so that a fear of causing separation failure of the top part in a product tire can be effectively removed.

Figure 7A:
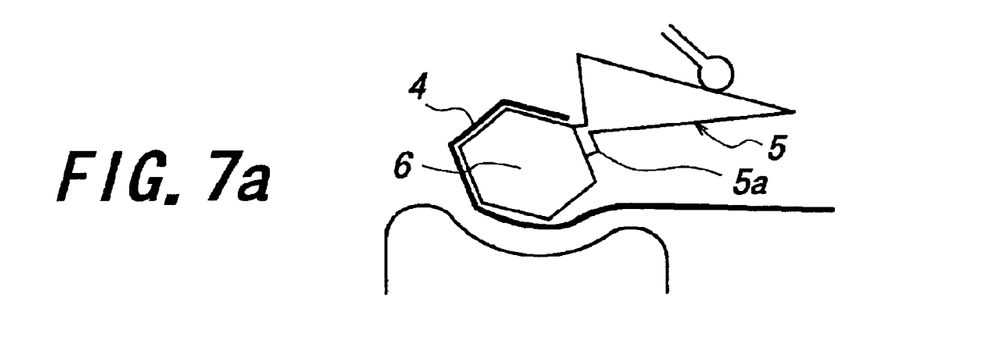
FIGS. 7a and 7b are schematic views illustrating another fall-down and stand-up embodiments of a stiffener, respectively.
Figure 7B:
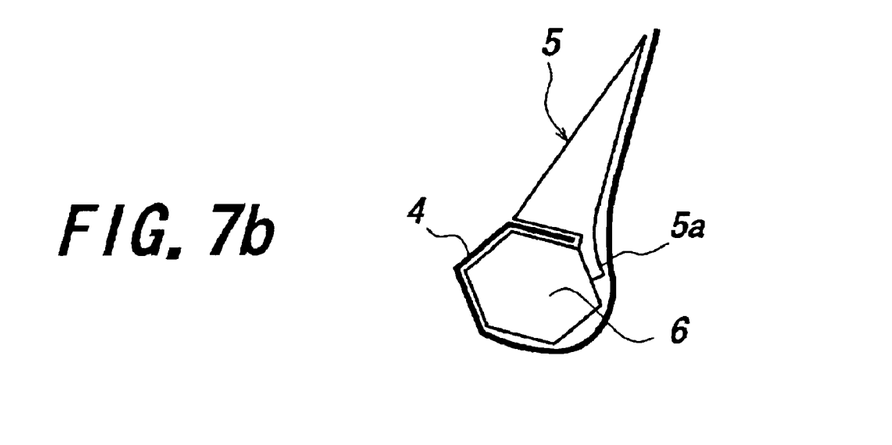

Although the fall-down and stand-up operations of the stiffener 5 attached to the bead core 6 are described under an action of the notch 9 formed in the stiffener, they can be conducted by ripping off the stiffener 5 attached to the bead core 6 from a surface of the bead core 6 up to a position that the winding of the wrap portion 4 of the carcass band 3 around the bead core 6 is not trouble in the setting of the bead core 6 to fall-down the stiffener 5 as shown in FIG. 7a and then standing up the stiffener 5 so as to again attach a ripped portion of the stiffener 5 onto the wrap portion 4 after the setting of the bead core 6 as shown in FIG. 7b. Even in this case, the lowering of the shaping efficiency can sufficiently be prevented based on the previous attachment of the stiffener 5 to the bead core 6.

Particularly, the support tongue-shaped portion 5a formed in the stiffener 5 effectively functions likewise the aforementioned case, whereby the separation of the stiffener 5 from the bead core 6 can be sufficiently prevented.

As mentioned above, according to the invention, it is possible to previously attach the stiffener to the bead core 6 by falling and standing deformations of the stiffener, and hence a separate and independent operation of arranging the stiffener alone is useless in the tire shaping step and the lowering of the shaping efficiency can sufficiently be prevented. And also, the stiffener and bead core can be handled as a single part in steps of arrangement, setup and so on prior to the tire shaping operation, so that a complicated handling thereof and the like can advantageously be removed.

What is claimed is:

1. A method of manufacturing a pneumatic tire, in which an end portion of a carcass ply extends around a ring-shaped bead core and a stiffener is disposed on an outer peripheral side of a turnup portion of the carcass ply, comprising:
   folding a carcass material at both axial end portions in a direction opposite to each other to form a pair of hook-shaped wrap portions, and shaping the carcass material into a cylinder to form a carcass band;
   setting a pair of bead cores each attached to a stiffener inside respective ones of said hook-shaped wrap portions in a fall-down posture of the stiffener, the stiffener thereafter being stood up on an outer peripheral side of the respective wrap portion; and
   joining a belt and a tread on an outer peripheral side of the carcass band.

2. The method according to claim 1, wherein in the setting of the bead cores, the bead cores are supported by a bead setter and moved to given positions in an axial direction between both wrap portions of the carcass band, the wrap portions are subjected to an elastically enlarging deformation by moving the bead setter outward in the axial direction, and subsequently the bead setter is retracted outward in a radial direction.

3. The method according to claim 1, wherein the stiffener is fallen down at a position corresponding to a notch formed in the stiffener.

4. The method according to claim 2, wherein the stiffener is rendered into the fall-down posture after the bead cores are supported by the bead setter.

5. The method according to claim 2, wherein the head cores are locked, and wherein the stiffener is fallen down after the bead cores are locked and before the bead setter is retracted outward in the radial direction.

6. The method according to claim 2, wherein the stiffener is fallen down before the bead cores are supported by the bead setter.

7. The method according to claim 1, wherein the stiffener comprises a support tongue-shaped portion protruding in a falling direction of the stiffener, and wherein the support tongue-shaped portion is attached to a surface of the bead core, the support tongue-shaped portion preventing an unexpected separation of the stiffener from the respective bead core.

8. The method according to claim 2, further comprising locking the bead cores and shaping the carcass band, and wherein the stiffener is stood up after the bead setter is retracted outward in the radial direction with the locking of the bead cores and before the carcass band is subjected to said shaping.

9. The method according to claim 1, further comprising locking the bead cores and shaping an axially central portion of the carcass band, and wherein the stiffener is stood up in an expansion deformation of the axially central portion of the carcass band through the shaping thereof after the bead core is locked.

10. The method according to claim 2, wherein the bead cores are locked at a state in which the wrap portions are elastically enlarged, and thereafter the bead setter is retracted outward in the radial direction.

11. The method according to claim 2, wherein the bead setter is moved inward in the radial direction prior to the enlarging deformation of the wrap portion.

12. The method according to claim 1, wherein operations ranging from the setting of the bead cores to the joining of the belt and the tread to the carcass band are carried out on one shaping drum.

13. The method according to claim 1, wherein after the setting of the bead core is completed, the carcass band is transferred to a shaping drum to conduct the joining of the belt and the tread to the carcass band.

14. The method according to claim 11, wherein the carcass band is transferred to a shaping drum together with the bead setter before the setting of the bead core is completed and thereafter the bead core is set to conduct the joining of the belt and the tread to the carcass band.

* * * * *